Patented Apr. 21, 1953

2,636,035

UNITED STATES PATENT OFFICE 2,636,035

SYNTHESIS OF LEPIDINIUM SALTS

Donald W. Heseltine and Leslie G. S. Brooker, Rochester, N. Y., assignors to Eastman Kodak Company, Rochester, N. Y., a corporation of New Jersey No Drawing. Original application April 8, 1950, Serial No. 154,882. Divided and this application June 22, 1951, Serial No. 233,114

5 Claims. (Cl. 260—286)

This invention relates to a new process for preparing lepidinium salts and new quaternary salts obtained thereby.

It is known that lepidine bases can be prepared by reacting an aromatic primary amine hydrochloride with methyl vinyl ketone in the presence of an oxidizing agent, e. g. ferric chloride. (Campbell U. S. Patent 2,451,610, dated October 19, 1948.)

We have now found that acid addition salts of aromatic secondary amines can be condensed with methyl vinyl ketone in the presence of an oxidizing agent to give, not a lepidine base as might be expected, but a lepidinium quaternary salt.

It is, therefore, an object of our invention to provide a new method for preparing lepidinium quaternary salts. A further object is to provide lepidinium salts, some of which have not heretofore been known. Still another object is to provide a method for preparing N-aryl quaternary salts. Other objects will become apparent from a consideration of the following description and examples.

According to our invention we provide a new process for preparing lepidinium quaternary salts which comprises reacting an acid addition salt of an aromatic secondary amine with methyl vinyl ketone in the presence of an oxidizing agent.

The aromatic secondary amines whose acid addition salts can be used in our invention comprise the N-alkylarylamines, such as N-methylaniline, N-ethylaniline, N-methyl-p-chloroaniline, N-methyl-p-toluidine, etc., the diarylamines, such as diphenylamine, p,p′-ditolylamine, p,p′-dichlorodiphenylamine, etc. and heterocyclic secondary amines, such as tetrahydroquinoline, dihydroindole (indoline), carbazole, 3,4,5,6-tetrahydrocarbazole, phenothiazine (thiodiphenylamine), phenoxazine (phenazoxine), 2,3-trimethyleneindoline, etc. The acid addition salts of the N-alkylaryl and diaryl amines useful in practicing our invention can advantageously be represented by the following general formula:

I

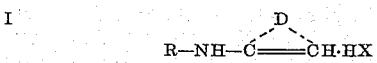

wherein R represents an alkyl group, such as methyl, ethyl, etc., or an aryl group, such as phenyl, o-, m-, or p-tolyl, o-, m-, or p-chlorophenyl, o-, m-, or p-hydroxyphenyl, etc. (e. g. a mono-nuclear aryl group of the benzene series), D represents the non-metallic atoms necessary to complete an aromatic nucleus, such as phenyl, o-, m-, and p-chlorophenyl, etc. (e. g. a mono-nuclear aryl group of the benzene series), and X represents an acid radical, e. g. chlorine, bromine, iodine, sulfate, chlorate, thiocyanate, alkylsulfate (e. g. methyl sulfate), toluenesulfonate, etc. The acid addition salts of the heterocyclic secondary amines useful in practicing our invention can advantageously be represented by the following general formula:

II

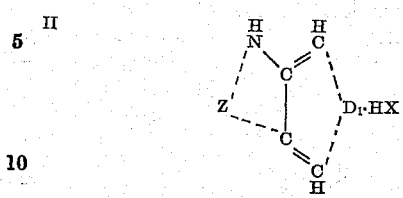

wherein $D_1$ represents the non-metallic atoms necessary to complete an aromatic nucleus, such as phenyl, chlorophenyl, hydroxyphenyl, etc. nuclei (e. g. an aromatic nucleus of the benzene series), X has the meaning given above, and Z represents the non-metallic atoms necessary to complete a heterocyclic nucleus containing from 5 to 6 atoms in the heterocyclic ring, such as tetrahydropyrrole (II represents indoline type), indole (II represents carbazole or tetrahydrocarbazole type), benzothiazine (II represents phenothiazine type), etc. nuclei. The aromatic nuclei can have substituted thereon Cl, Br, alkoxyl (e. g. methoxyl, etc.), hydroxyl, etc. groups, although, as can be seen from the above general formulas, at least one of the positions ortho to the secondary nitrogen atom in the compounds of Formula I, or peri to that of the secondary nitrogen atom in the compounds of Formula II, should be free of substituents.

As oxidizing agents we can advantageously use mononuclear nitroaromatic compounds of the benzene series, such as nitrobenzene, nitrotoluene, etc., nitroaromatic sulfonic acids, such as m-nitrobenzenesulfonic acid, etc., nitrophenols, such as o- and p-nitrophenol, etc., ferric halides, such as ferric chloride, etc., arsenic pentoxide or arsenic acid, etc. Ordinary less advantageously than in the presence of the conventional oxidizing agents set out above.

Instead of employing the acid addition salt of the secondary amine as such, according to the method described above and in certain of the following examples, the secondary amine can be suspended in an aqueous solution of an acid, and the reaction carried out in this medium. Under these conditions the acid forms an addition salt with the secondary amine, and the latter undergoes condensation with the ketone. Hydrochloric or sulfuric acids have been found to provide aqueous solutions which are excellently adapted as reaction media for the process of our invention. A condensation agent or catalyst, such as zinc chloride, etc. can be added to the reaction mixtures, if desired. The condensation agent can also serve as an oxidizing agent, or can be used with an oxidizing agent, such as ferric chloride.

The reaction can be carried out at room temperature (about 25° C.) or at temperatures as high as the refluxing temperature of the reactants. Generally, heating the reactants at refluxing temperature provides a rapid, efficient process. Inert diluents, e. g. aliphatic primary alcohols, 1,4-dioxane, etc., can be employed, if desired.

The process of our invention can be carried out in stepwise fashion by first condensing the aromatic secondary amine addition salt with the methyl vinyl ketone, followed by oxidation of the intermediate formed in the presence of one of the oxidizing agents mentioned above. It has been found to be most advantageous, however, to operate the process of our invention as described in the following examples.

Among the lepidinium quaternary salts which have not previously been described that are obtained according to the process of our invention are those represented by the following two general formulas:

III
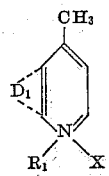

and

IV
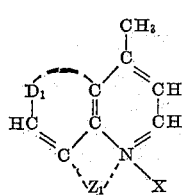

wherein $D_1$ has the value set forth above, $R_1$ represents a mononuclear aromatic nucleus of the benzene series (e. g. phenyl, o- and p-chlorophenyl, o- and p-methoxyphenyl, etc.), $Z_1$ represents the non-metallic atoms necessary to complete a heterocyclic nucleus containing from 5 to 6 atoms in the heterocyclic ring, and X has the value set forth above. Among the compounds coming within the scope of Formula IV are those represented by the following three general formulas:

V
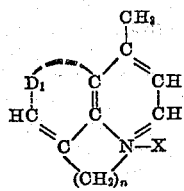

VI
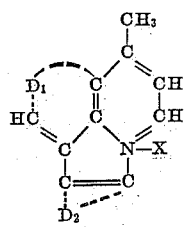

and

VII
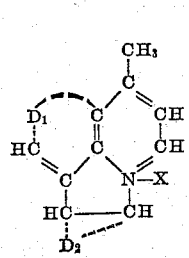

wherein $D_1$ and X have the values set forth above, $D_2$ represents a carbocyclic nucleus containing from 5 to 6 atoms in the ring, and $n$ represents a positive integer from 2 to 3.

The following examples will serve to illustrate further the manner whereby we practice our invention.

*Example 1.—1-phenyllepidinium iodide*

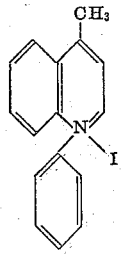

Diphenylamine hydrochloride (102.5 g.), o-nitrophenol (46 g.) and anhydrous zinc chloride (5 g.) were dissolved in 400 cc. absolute ethyl alcohol. The reaction mixture was heated under reflux with mechanical stirring and 50 g. of methylvinyl ketone were added dropwise over a period of two hours. The heating was continued overnight and then the alcohol was removed, and the residue extracted with two liters of boiling water. The aqueous portion was then made just alkaline with alkali, treated with decolorizing carbon and filtered. The filtrate was acidified with hydrochloric acid, 50 g. of sodium iodide added and the solution evaporated to dryness under reduced pressure. The dry salts were then extracted with two 300 cc. portions of absolute ethyl alcohol and the alcohol extracts concentrated to 100 cc. and chilled overnight. The quaternary salt was filtered off and recrystallized from 150 cc. of water yielding 30.5 g. (17%) of amber colored crystals with a M. P. of 233°–235° C. with decomposition.

Anal. calcd. for $C_{16}H_{14}IN$: I, 36.6. Found: I, 36.4.

*Example 2.—1,8-trimethylenelepidinium iodide*

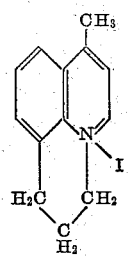

Tetrahydroquinoline hydrochloride (60 g.), ferric chloride (anhydrous) (115 g.) and anhydrous zinc chloride (5 g.) were dissolved in 300 cc. of absolute ethyl alcohol. The reaction mixture was heated under reflux with mechanical stirring and 38 g. of methylvinyl ketone were added dropwise over a period of two hours. The reaction mixture was refluxed overnight and the alcohol distilled off. The residue was extracted with three liters of boiling water and the water solution made just alkaline with 40% sodium hydroxide. Filter-cel (100 g.) was added, the solution filtered, and the filtrate acidified with hydrochloric acid. Then 50 g. of sodium iodide were added and the aqueous solution was taken to dryness under reduced pressure. The mixture of salts was extracted with 500 cc. of boiling absolute ethyl alcohol, the alcohol solution concentrated to 150 cc., and chilled overnight. The quaternary salt was filtered off, dissolved in a minimum amount of boiling water, treated with 2 g. of decolorizing carbon, filtered and chilled. The product was filtered off and dried, yielding 22 g. (19.4%) of yellow crystals having a M. P. of 186°–187° C. with decomposition.

Anal. calcd. for C13H14IN: I, 40.8. Found: I, 41.0.

*Example 3.—1,8-ethylenelepidinium iodide*

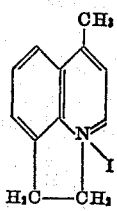

Indoline (60 g.) was dissolved in 180 cc. of 10% hydrogen chloride in absolute ethyl alcohol and added to 162 g. of ferric chloride in 300 cc. of ethyl alcohol. Anhydrous zinc chloride (10 g.) was then added and the reaction mixture heated under reflux with mechanical stirring. Methyl-vinyl ketone (85%, 50 g.) was then added dropwise over a period of two hours. The reaction mixture was heated overnight and then the alcohol distilled off on the steam bath. The residue was extracted with three liters of boiling water, the aqueous solution filtered, treated with decolorizing carbon and made just alkaline with 40% sodium hydroxide. Filter-cel (100 g.) was stirred in, the solution filtered, made just acid with hydrochloric acid and 50 g. of sodium iodide added. The aqueous solution was then evaporated to dryness under reduced pressure and the combined salts were extracted with two 300 cc. portions of absolute ethyl alcohol. The alcoholic extracts were concentrated to 150 cc. and chilled overnight. The crystalline quaternary salt was filtered off and recrystallized from 100 cc. of water yielding 23.8 g. (17%) of yellowish crystals having a M. P. of 192–194° C. with decomposition.

Anal. calcd. for C12H12IN: I, 42.7. Found: I, 42.6.

*Example 4.—1,8-o-phenylenelepidinium iodide*

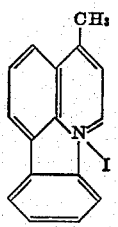

Carbazole (84 g.) was suspended in 400 cc. of absolute ethyl alcohol and 49 g. of sulfuric acid was added dropwise with stirring. Then 23 g. of o-nitrophenol and 10 g. of anhydrous zinc chloride were added and the reaction mixture heated to reflux temperature. Methylvinyl ketone (50 g) was then added dropwise over a period of two hours and the heating continued overnight. The alcohol was removed by distillation, the residue extracted with four liters of boiling water, and the aqueous extract neutralized with sodium carbonate. The water solution was treated with decolorizing carbon, filtered, acidified with hydrochloric acid, 20 g. of sodium iodide added, and then evaporated to dryness under reduced pressure. The dry mixed salts were extracted with 500 cc. of absolute alcohol. The alcoholic solution was concentrated to 75 cc. and the quaternary salt thrown out of solution by the addition of ether. The ether-alcohol solution was decanted and the sticky residue stirred with acetone until crystalline. The quaternary salt was filtered off and recrystallized from ethyl alcohol yielding 6.2 g. (3.6%) of yellowish powder.

*Example 5.—1,8-(3,4,5,6-tetrahydro-o-phenylene) lepidinium iodide*

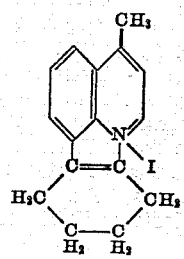

3,4,5,6-tetrahydrocarbazole (85.6 g.) was dissolved in 500 cc. of nitrobenzene in a two-liter, three-necked flask fitted with a condenser and a mechanical stirrer. Concentrated sulfuric acid (49 g.) was added dropwise, the reaction mixture was heated to the reflux temperature and 70 g. of methylvinyl ketone were added dropwise over a period of one hour. The heating and stirring were continued overnight and then the nitrobenzene was removed by steam distillation. The aqueous solution was decanted from the tar, neutralized with sodium carbonate, extracted with benzene, and finally, acidified with hydrochloric acid. The aqueous portion was then evaporated to dryness under reduced pressure and the mixed salts remaining were extracted with 500 cc. of absolute ethyl alcohol. The alcoholic solution was concentrated to 100 ml., chilled, and filtered. The crude quaternary salt was dissolved in 100 cc. of hot water and precipitated by the addition of 10 g. of sodium iodide yielding 9.5 g. (5%) of brown powder. Recrystallization from water gave yellow cubes, M. P. 268°–270° C. with decomposition.

*Example 6.—1,8-o-cyclopentylenelepidinium perchlorate*

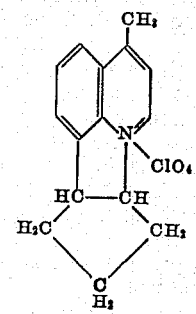

1,2,3,4,3a,8b-hexahydrocyclopentindole (32 g.), o-nitrophenol (14 g.) and zinc chloride (2 g.) were dissolved in 200 cc. of absolute ethyl alcohol in a one-liter, three-necked flask fitted with a condenser and a mechanical stirrer. Sulfuric acid (20 g.) was added dropwise with stirring, and the reaction mixture was heated to reflux. Then freshly distilled methyl vinyl ketone (20 g.) was added dropwise over a period of one hour. The reaction mixture was heated with stirring for an additional two hours and then as much alcohol as possible was removed by distillation. The residue was extracted with one liter of boiling water and the aqueous portion neutralized with sodium carbonate and extracted with benzene. The aqueous extract was then acidified with hydrochloric acid and concentrated to 100 cc. The crude quaternary salt was precipitated by the addition of sodium perchlorate (20 g. in 40 cc. of water), the solution chilled and the water decanted leaving 25 g. (41%) of crude product as a heavy yellow oil. The salt, after repeated washing with water, ether and ethyl alcohol and drying for 48 hours over calcium chloride in a vacuum desiccator, was a yellow, friable, very hydroscopic solid.

The 1,2,3,4,3a,8b - hexahydrocyclopentindole used in the above example was prepared by reducing 1,2,3,4-tetrahydrocyclopentindole in an alcoholic solution using Raney nickel as a catalyst. The solution was heated at 100° C. for 24 hours at 1500 p. s. i. The desired product was obtained as a colorless liquid boiling at 98°–100° C./10 mm.

*Example 7.—3-methylpyrido-(k,l)-phenothiazinium iodide*

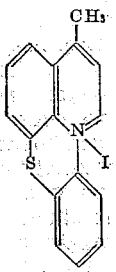

Phenothiazine (199 g.) was suspended in one liter of absolute ethyl alcohol and o-nitrophenol (46 g.) and anhydrous zinc chloride (5 g.) were added. Concentrated sulfuric acid (98 g.) was added dropwise with stirring. The reaction mixture was then heated to boiling in a five-liter, three-necked flask fitted with a condenser and a mechanical stirrer and methyl vinyl ketone (freshly distilled) (80 g.) was added dropwise over a period of two hours. The reaction mixture was heated under reflux overnight and then as much alcohol as possible removed by distillation. The residue was stirred with several portions of ether and the ether decanted. The remaining oil was stirred with three liters of acetone to remove the excess phenothiazine. The acetone was decanted and the residue extracted with one liter of boiling water. The aqueous extract was treated with decolorizing carbon, filtered and sodium iodide (20 g.) added and the solution chilled. The product was filtered off, washed with acetone and recrystallized from methyl alcohol and then from water, yielding 7.3 g. (2%) of amber crystals melting at 287–288° C. with decomposition.

Operating in a manner similar to that illustrated above, other lepidinium salts can be prepared according to the process of our invention. The lepidinium salts prepared according to the process of our invention can be used in the preparation of other useful materials, such as polymethine dyes, as described in the application of Donald W. Heseltine and Leslie G. S. Brooker, Serial No. 154,883, filed on April 8, 1950.

This application is a division of our application Serial No. 154,882, filed on April 8, 1950, now U. S. Patent 2,578,304, issued December 11, 1951.

What we claim as our invention and desire secured by Letters Patent of the United States is:

1. A process for preparing lepidinium quaternary salts comprising condensing a compound selected from those represented by the following general formula:

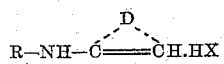

wherein R represents a member selected from the group consisting of an alkyl group and an aryl group, D represents the non-metallic atoms necessary to complete an aromatic nucleus, and X represents an acid radical, with methyl vinyl ketone in the presence of an oxidizing agent.

2. A process for preparing lepidinium quaternary salts comprising condensing a compound selected from those represented by the following general formula:

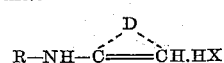

wherein R represents a mononuclear aryl group of the benzene series D represents the non-metallic atoms necessary to complete a mononuclear aryl group of the benzene series, and X represents an acid radical, with methyl vinyl ketone in the presence of an oxidizing agent.

3. A process for preparing lepidinium quaternary salts comprising condensing a compound selected from those represented by the following general formula:

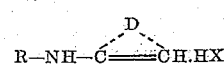

wherein R represents an alkyl group containing from 1 to 2 carbon atoms, D represents the non-metallic atoms necessary to complete a mononuclear aryl group of the benzene series, and X represents an acid radical, with methyl vinyl ketone in the presence of an oxidizing agent.

4. A process for preparing lepidinium quaternary salts comprising condensing a compound selected from those represented by the following general formula:

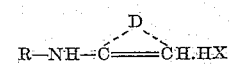

wherein R represents a mononuclear aryl group of the benzene series, D represents the non-metallic atoms necessary to complete a mononuclear aryl group of the benzene series, and X represents an acid radical, with methyl vinyl ketone in the presence of a mononuclear nitroaromatic compound of the benzene series.

5. A process for preparing lepidinium quaternary salts comprising condensing a compound selected from those represented by the following general formula:

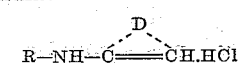

wherein R represents a mononuclear aryl group of the benzene series and D represents the non-metallic atoms necessary to complete a mononuclear aryl group of the benzene series, with methyl vinyl ketone in the presence of an oxidizing agent.

DONALD W. HESELTINE.
LESLIE G. S. BROOKER.

References Cited in the file of this patent

UNITED STATES PATENTS

| Number | Name | Date |
|---|---|---|
| 2,158,287 | Konig | May 16, 1939 |
| 2,536,973 | Anish | Jan. 2, 1951 |

FOREIGN PATENTS

| Number | Country | Date |
|---|---|---|
| 710,748 | Germany | Sept. 20, 1951 |